United States Patent [19]
Chitwood et al.

[11] Patent Number: 5,347,749
[45] Date of Patent: Sep. 20, 1994

[54] TERMITICIDE DELIVERY SYSTEM

[75] Inventors: Kenneth Chitwood, Casselberry; Richard Knipp, Winter Springs; Richard Schmitt, Sanford, all of Fla.

[73] Assignee: Pestban Pest Control of Florida, Inc., Longwood, Fla.

[21] Appl. No.: 21,593

[22] Filed: Feb. 24, 1993

[51] Int. Cl.$^5$ .............................................. A01M 7/00
[52] U.S. Cl. ..................................... 43/124; 43/132.1
[58] Field of Search ............... 43/124, 132.1, 900; 137/357; 239/200, 208, 209; 52/168, 101, 302, 517

[56] References Cited

U.S. PATENT DOCUMENTS

| | | | |
|---|---|---|---|
| 2,842,892 | 7/1958 | Alchidge | 43/124 |
| 2,981,025 | 4/1961 | Woodson | 43/124 |
| 3,151,746 | 10/1964 | Reusttle | 43/124 |
| 3,209,485 | 10/1965 | Griffin | 43/124 |
| 3,513,586 | 10/1968 | Meyer . | |
| 3,602,248 | 8/1971 | Peacock . | |
| 4,893,434 | 1/1990 | Knipp | 43/124 |
| 5,007,197 | 4/1991 | Barbett | 43/124 |
| 5,184,418 | 2/1993 | Fletscher | 43/124 |

*Primary Examiner*—Kurt C. Rowan
*Attorney, Agent, or Firm*—Elsie T. Apthorp

[57] ABSTRACT

A system for reapplication of termiticide substance to the fill dirt underlying the foundation slab of a building at potential termite entry points is installed prior to pouring the slab. The system has a single, endless unbranched emitter circuit of apertured, flexible tubing, disposed upon the fill dirt at the perimeter edges of the slab and around the openings in the slab where bundles of utility connections penetrate the slab. The emitter circuit is fed by a redundancy of open-ended unperforated trunk lines, connected to the emitter circuit at spaced apart intervals, to equalize distribution of termiticide to all soil areas adjacent the emitter circuit, the despite possible breaks or clogging in one or more trunk lines or in the emitter circuit. The trunk lines run from the emitter circuit under the slab, are bundled, and run through a single channel drilled horizontally through a foundation block, to the outside of an exterior wall of the building. After the building is constructed, the trunk lines run to an opening in a panel in a receptacle box mounted on the exterior wall. A pressurized source of termiticide is coupled to a manifold having a plurality of delivery tubes removably coupled to the trunk lines at the receptacle box, thereby permitting simultaneous delivery of termiticide to all trunk lines, which promotes equalized distribution of termiticide throughout the emitter circuit, from one location outside the building.

3 Claims, 3 Drawing Sheets

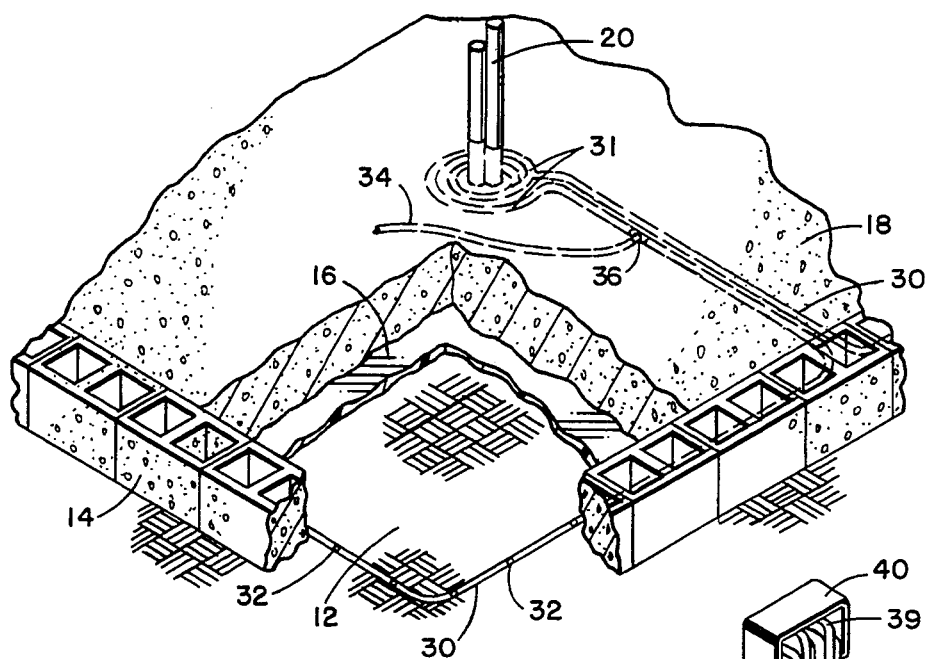
FIG. 4
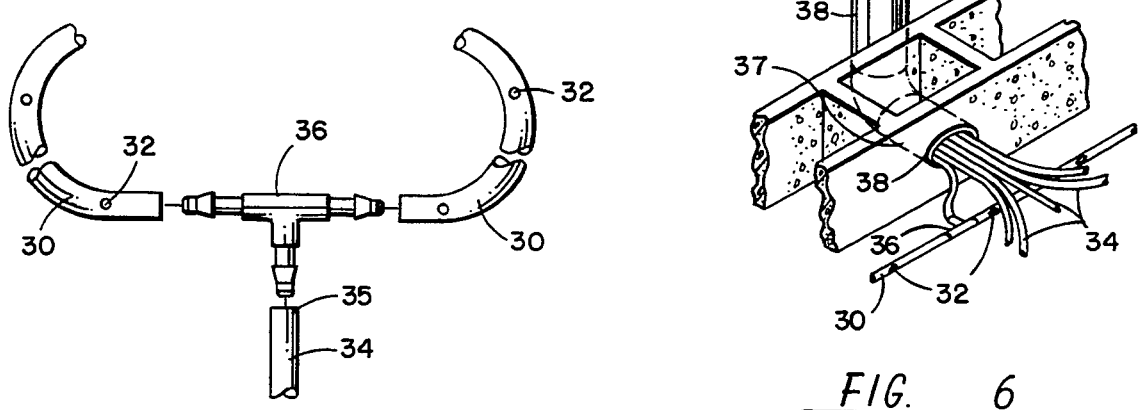
FIG. 5
FIG. 6
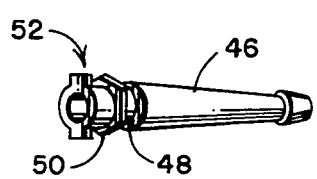
FIG. 7

TERMITICIDE DELIVERY SYSTEM

BACKGROUND OF THE INVENTION

The present invention relates to a termiticide distribution system for installation at potential termite entry locations under a concrete foundation slab of a building prior to laying of the foundation, to permit resaturation of the underlying fill dirt with termiticide after the building is constructed.

Although it is now common practice in the construction of new buildings to pretreat the fill or soil area which is to underlie the foundation with a termiticide, the initial termite barrier does not last indefinitely, and there is a need to renew this barrier during the life of the building by efficient and inexpensive means at the points where termites can gain access to wooden structural members. Termites do not bore holes through concrete. However they can gain entry into the areas where wood is used in the construction of the building by forming earthen tunnels within the minute spaces that occur between foundation and slab, and where utility conduits protrude through a slab, because concrete contracts as it cures and hardens. Accordingly there is a continuing need for a installing a permanent termiticide distribution system at these junction areas during the initial construction of a building which will permit reapplication to the underlying fill dirt of termiticide from time to time to renew the termite barrier wherever minute spaces form between foundation and slab and particularly around the places where the utility connections penetrate the slab, where termites are most likely to build their tunnels upward into the building proper.

Heretofore there have been a number of fluid distribution systems for insecticides, comprised of conduit capable of emitting pesticide through apertures or valves, for incorporation in or under a building foundation. A number of these systems are elaborate in construction, requiring extensive modification of traditional and conventional building methods, expensive pumps and reservoirs, and resulting in substantial increases in building costs, as has been previously noted in U.S. Pat. No. 3,513,586 to Meyer et al. Meyer discloses and teaches a distribution system comprising tube means disposed within a building footer constructed of conventional concrete building blocks, requiring additional support members and plate members, among other things, that but for the distribution system, would not be required as part of the footer.

U.S. Pat. No. 3,209,485 to Griffin discloses a pesticide distribution system comprised of multiple, independent, branched circuits, to be installed within and under a foundation. The system comprises many parts and installation requires multiple steps at different stages of construction of the building.

U.S. Pat. No. 3,602,248 to Peacock discloses a distribution system comprised of a plurality of parallel connected pipe branches, each branch thereof short enough so that fluid pressure is maintained along the entire piping, and at least two inlets into each branch. Each branch requires a closure fitting at the end opposite the inlet end. Multiple pumps are required to maintain uniform pressure in the branch lines.

There are a number of related systems for distributing pesticide within the walls of buildings. In the Ramsey patent, U.S. Pat. No. 3,676,949, pipes with emitter nozzles pass through the studs of the walls, with a nozzle disposed between each set of studs. In U.S. Pat to Bridges et al., U.S. Pat. No. 3,782,026, pipes extend within the walls or alternatively, beneath baseboard moldings on the interior walls, permitting injection of insecticide gas within the walls. In Lundwall, U.S. Pat. No. 4,0228,841, an insecticide storage and pressurizing system is installed in the attic and perforated pipes carry pest control fluid into the building walls. In U.S. Pat, No. 4,742,641 to Cretti, a built-in reservoir is installed in within a building wall and pesticide is distributed whenever the pump is operated, which can be done by a timing device for injecting predetermined amounts at predetermined spaced intervals. U.S. Pat. No. 3,330,062 to Carter is another pest control system utilizing pipes installed through holes drilled through the wall studs of a building. The pipes require threaded caps at the distal ends thereof. U.S. Pat. No. 4,944,110 to Sims is for method of applying pesticide to the concealed areas of a building, utilizing injection of pressurized chemicals into perforated tubing. A divisional application for a related apparatus was filed by Sims.

None of the foregoing have disclosed a simplified, inexpensive system of delivering pesticide to the critical areas of the fill dirt underlying a concrete slab of a building the installation of which requires no modification of building construction plans or drawings, no drilling of multiple holes through the studs or footers, no expensive pumps, and no special support structures. Additionally, there is no prior art incorporating the concept of equalizing fluid pressure throughout the entire distribution system by simultaneous injection through redundant trunk lines to feed a single emitter line, so as to insure equalized distribution of pesticide to all soil areas adjacent the emitter line, despite possible clogging, breaks or other impediments to flow in either the emitter circuit or the trunk lines. The prior art systems are not quickly installed and can delay construction of a building. Frequently the slab is poured almost immediately after grading of the construction site, and there is a need for a termiticide distribution system that can be installed very quickly on short notice, so that construction can proceed without delays.

None of the foregoing systems focuses on the only areas where termites can possibly get past the slab: the minute spaces formed by contraction of the concrete slab, at its juncture with the foundation and around the utility conduits. The spaces left by contracting cement around the utility connections are particularly susceptible of termite infestation because of the likelihood of water leaks from plumbing lines. At the present time, and surely in the foreseeable future, there are limits imposed by the Environmental Protection Agency and other governmental bodies on the amount of toxic insecticides that may be injected into the ground, because of considerations such as contamination of underground fresh water supplies, harmful effects on birds and other wildlife. Accordingly it is desirable to confine the reapplication of a termite barrier to only those points that really need it.

Accordingly it is an object of this invention to provide a system for treatment of the fill dirt underlying the foundation slab of a building after construction, which can be installed prior to laying the slab, which is easily and quickly installed in approximately thirty minutes or less, which does not require any special supporting structures or substantial modifications of conventional building methods or specifications, which is confines redistribution of termiticide to only those areas where termites can gain entry into the building proper, which ensures equalized distribution of termiticide throughout the system, and which utilizes inexpensive materials.

Another object of this invention is to provide a system which is easily and conveniently injected with termiticide by a pest control service person, at a single injection location in or on the building, preferably outside the building.

SUMMARY OF THE INVENTION

In accordance with the present invention a system for reapplication of termiticide substance to the fill dirt underlying the foundation slab of a building at potential termite entry points is provided which utilizes a single, endless unbranched emitter circuit of apertured, flexible tubing, disposed upon the fill dirt at the perimeter edges of the slab and around the openings in the slab where bundles of utility connections penetrate the slab, installed prior to the pouring of the slab, which emitter circuit is fed by a redundancy of open-ended unperforated trunk lines, each connected at one end to the emitter circuit at spaced apart intervals, to ensure delivery of termiticide to all soil areas adjacent the emitter circuit despite possible breaks or clogging in one or more trunk lines or in the emitter circuit. The trunk lines run from the emitter circuit under the slab, are bundled, and run through a single channel drilled horizontally through a foundation block, to the outside of an exterior wall of the building. After the building is constructed, the trunk lines are led to a common receptacle box mounted on the exterior wall, where the other end of each trunk line is fitted with a specially made fastener that locks in place on a panel within the receptacle box. A pressurized source of termiticide is coupled to a manifold having a plurality of delivery tubes removably coupled to the trunk lines at the common receptacle box, thereby permitting simultaneous delivery of termiticide to all trunk lines which promotes equalized distribution of termiticide throughout the emitter circuit, from one location outside the building.

BRIEF DESCRIPTION OF THE DRAWINGS

Embodiments of the invention are shown in the accompanying drawings for purposes of illustration and description, wherein:

FIG. 4 is cutaway partial perspective view of a foundation and slab showing the underlying soil with tubing of the invention in place beneath a vapor barrier and slab.

FIG. 5 is an exploded detail view showing connection of a trunk line of the invention to a portion of the emitter circuit.

FIG. 6 is a detail view of delivery tubes bundled in a conduit leading from the foundation through a foundation wall to the rear of the terminal receptacle box.

FIG. 7 is an enlarged detail view of a terminal fastener.

DETAILED DESCRIPTION OF THE PREFERRED EMBODIMENT

Figure 1:
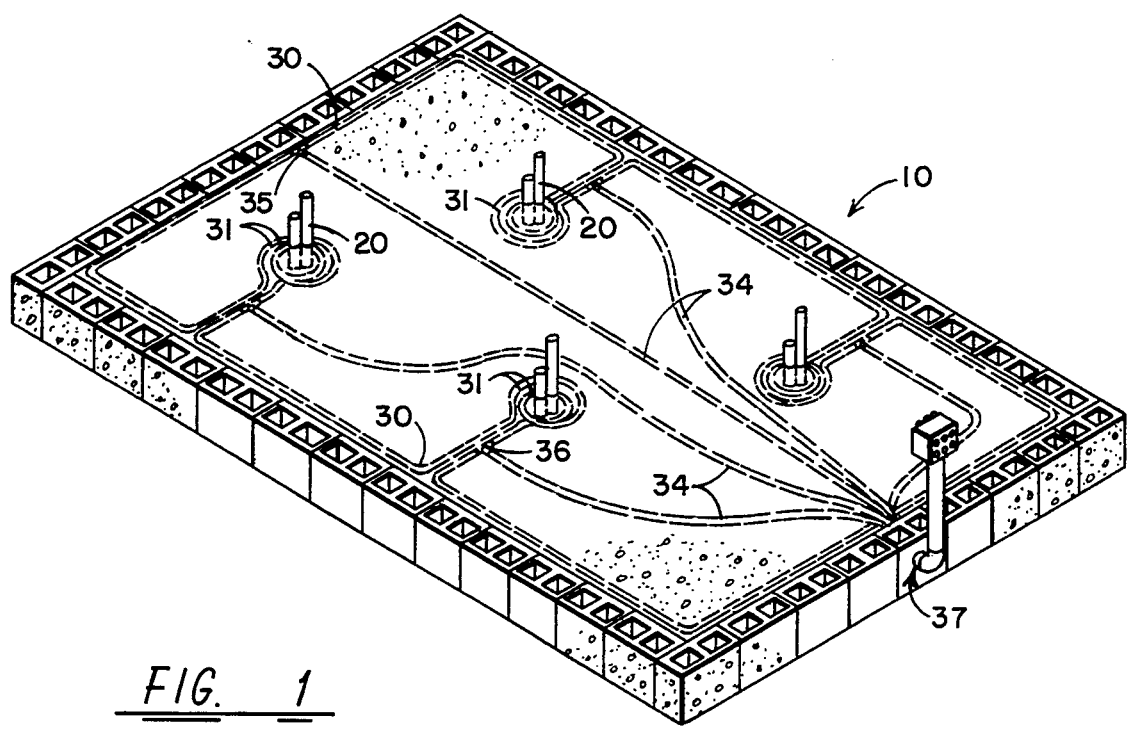
FIG. 1 is a perspective view of a foundation and slab of a building with the invention installed under the slab.
Figure 2:
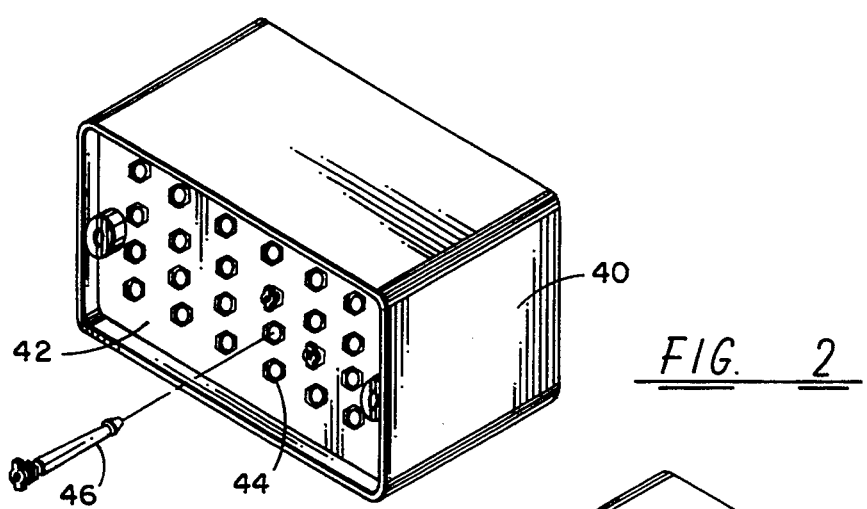
FIG. 2 is a front perspective view of a terminal receptacle box with mounting panel and an exploded view of a terminal fastener mounted in the panel.
Figure 3:
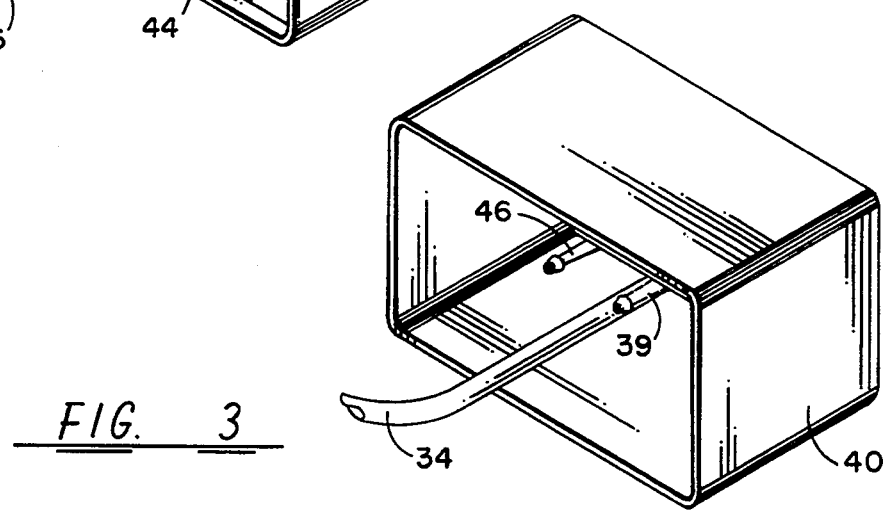
FIG. 3 is a rear perspective view of the terminal receptacle box showing two mounted terminal fasteners with a trunk line tube connected to one fastener.

Referring more particularly to the drawings, FIG. 1 shows the invention 10 in place under a foundation 14 and slab 18 for a building under construction, with utility connections 20 protruding through the slab. A minute space between foundation 14 and slab 18 is unavoidable because customarily the foundation is formed prior to pouring of the slab. Upon curing of the concrete, slab 18 contracts, leaving a small space between it and the foundation. Likewise, when the slab cures, it contracts away from the bundles of utility connections 20. These small spaces are the entry points for subterranean termites to construct their earthen tunnels up to the structural studs and other wood used in constructing and framing the building upon the foundation. Accordingly, these areas are the critical places that need recurring soil treatment.

A continuous closed emitter circuit of apertured tubing 30 is shown disposed beneath slab 18. The numeral 32 indicates apertures in the tubing of the emitter circuit 30. FIG. 4 shows in more detail that the emitter circuit 30 lies on top of the underlying soil 12 and underneath a standard vapor barrier 16 which in turn lies under slab 18.

As depicted in FIGS. 1 and 4, emitter circuit 30 is a single unbranched endless circuit comprised of flexible tubing. As shown in FIGS. 1 and 4, it is of sufficient length to extend around the perimeter edges of slab 18 adjacent the foundation 14, and to extend inwardly to form several loops 31 around bundles of utility connections 20 that protrude through slab 18. A plurality of loops is desirable around the bundled utility conduits for the reason that the underlying dirt at these locations is much more apt to be damp and thus attractive to termites, due to small leaks or condensation dripping from plumbing pipes, and these areas are otherwise inaccessible without tearing up the building floor.

Apertures 32 are spaced preferably at six-inch intervals, although somewhat shorter or longer intervals are within the scope of the invention. The apertures should be laser-drilled rather than punched, so that tubing material is actually removed from each tiny aperture. Use of a laser is much more economical than any mechanical reaming process to create holes. Furthermore, attempts to make holes by mechanical means is not satisfactory, as the plastic material tends to have a "memory" and such holes will not remain open unless tubing material is removed.

Feeding the emitter circuit 30 are a plurality of trunk lines 34 comprised of lengths of unperforated flexible tubing open at each end. One end 35 of each length opens into emitter circuit 30 preferably through a T-shaped connector 36, well-known in the art, inserted into the emitter circuit 30, as shown in FIG. 5. All tubing ends are stretched and forced over the ends of connectors and held secure by the elasticity and resiliency of the tubing material. Each length of trunk line 34 runs under the slab 18, under vapor barrier 16 and through a common exit channel 37 drilled through the foundation wall 14 to the outside of an exterior wall of the building, not shown. All of the foregoing elements of the invention need to be installed after the foundation footer is installed but before the vapor barrier 16 is put into place and the slab 18 is poured. It is convenient to place all of the emitter circuit 30, trunk lines 34, and T connectors 36 at the time the soil fill 12 is treated initially with termiticide. This installation, including drilling 37 through the footer, takes only about 30 minutes.

Preferably the trunk lines 34 are bundled and inserted through a sleeve 38 of conduit, made of PVC for example, and the sleeved bundle then inserted through the exit channel 37. After the building is completed, the trunk lines 34 and sleeve 38 are led up the outside of an exterior wall, not shown, to a common receptacle box 40 having a panel 42 with a plurality of specially configured holes 44. The tube ends 39 are forced over specially designed connectors 46 which can be locked in place in the holes 44. Each hole 44 is configured with a round edge at the rear of the panel and a slightly larger hexagonal edge at the front of the panel. Each connector 46 has a narrow end for insertion into a tube end 35, and a wider end. Near the wide end it is fitted with an axial hexagonal member 50 of the same diameter as the hexagonal portion of hole 44, and an annular groove 48 of the same diameter as the round portion of hole 44. The connector 46 is mounted in the panel by inserting the narrow end into hole 44 from the front side of the panel 42 and forced through until the annular groove 48 reaches the round edge of the hole and the hexagonal member is stopped within the hexagonal edge of hole 44 by the smaller diameter of the round edge. It is easily ascertained that the connector, once snapped into place, does not rotate and is not easily dislodged. The wide end of the connector, 52, is provided with a means of coupling with an applicator tube, as shown in FIG. 7. Any commonly known coupling means for connecting the open ends of tubing end to end may be used. For instance, the end can be threaded to be received by a screw-on hose coupler.

Figure 8:
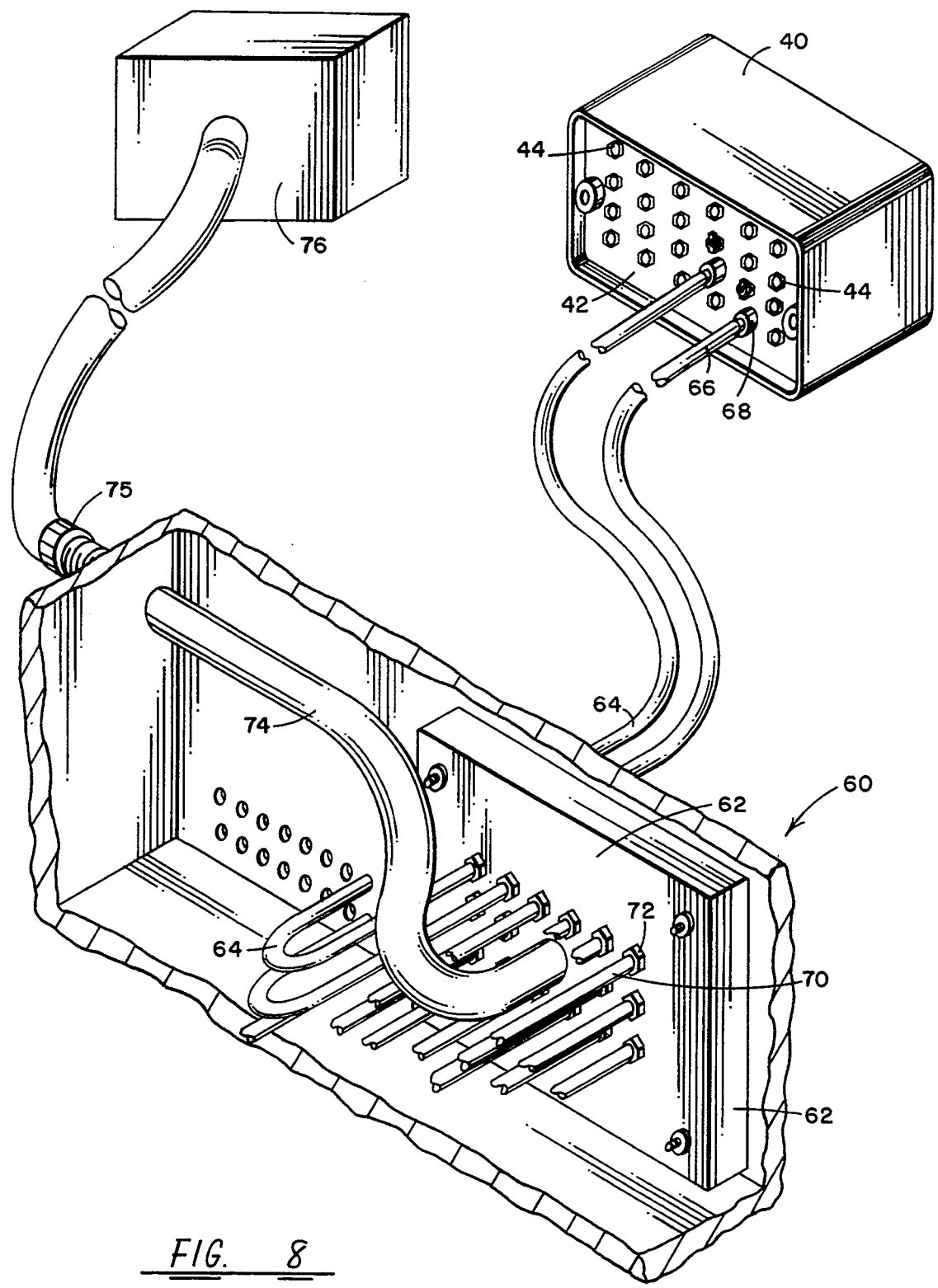
FIG. 8 is a detail perspective view of the terminal receptacle box having delivery tubes running between trunk lines and a manifold connected to a source of termiticide.

FIG. 8 depicts a removable applicator 60 comprised of a manifold 62 having a plurality of flexible open-ended delivery tubes 64. Ends 66 are fitted with coupling means 68 which removably couple to terminal connectors 46. Ends 66 of extra delivery tubes 64 in excess of the total number of trunk lines running to receptacle box 40 should be capped with plugs, not shown. Ends 70 of the delivery tubes connect to and communicate with the manifold 62 by connecting means 72. Any commonly available and appropriate coupling means can be utilized, such as screw-on hose connectors. The manifold is supplied with termiticide through an inlet conduit 74 which is in turn removably connected to a pressurized source 76 of termiticide, which is customarily a liquid.

When it becomes advisable to retreat the fill dirt under a building using the system of this invention, a licensed pest control service person connects a delivery tube 64 to each of the trunk line terminal connectors 46, and then injects termiticide from the source 76 into the manifold, which thereby provides simultaneous injection of all the trunk lines from a single location outside the building. The emitter circuit thus receives redundant injections of termiticide throughout, at no greater than thirty-foot intervals. This redundancy equalizes the fluid pressure to the trunk lines and results in more even distribution of chemical through apertures 32 to the critical soil areas underlying the minute spaces between utility connection bundles 20 and the slab 18, and the junction of foundation footer 14 and slab 18. Furthermore this redundancy ensures that even if a break or clogging occurs in the emitter circuit, or in a trunk line, thereby interrupting flow in to a particular area of the emitter circuit, a compensating flow is simultanouesly provided from another source and direction.

As will be apparent to those skilled in the art, there are variations and changes which can be made to the system and its elements as described hereinabove without departing from the true spirit and scope of the invention as defined in the following claims.

What is claimed is:

1. An improved termiticide delivery system for delivery of termiticide to potential termite entry areas of the fill dirt underneath the foundation slab of a building at the edges and joints thereof, comprising:

an endless unbranched emitter circuit comprised of a length of flexible tubing having a plurality of apertures spaced at intervals along the wall thereof for emitting termiticide therethrough, said emitter circuit disposed atop and across the fill dirt under the foundation slab and vapor barrier of a building, at the perimeter edges of said slab and around the edges of all openings through and interruptions of said slab;

a plurality of spiraling loops of said emitter circuit disposed around openings through said slab;

a plurality of flexible open-ended trunk lines comprising unapertured tube means, each trunk line having an injection end and a delivery end, each delivery end thereof connected to and opening into said emitter circuit at spaced-apart intervals selected to provide even distribution of termiticide throughout said emitter circuit, said trunk lines running under said slab to a common location on the outside of an exterior wall of said building;

a common receptacle box attached to said building wall and having a panel therein having a plurality of openings passing therethrough, and having the injection end of each of said trunk lines attached to said panel through one said opening therein;

applicator means comprising a manifold having a plurality of open-ended delivery lines comprised of flexible tubing, each line having a first and a second end, each said first end thereof attached and opening into said manifold, and each said second end thereof having coupling means whereby it is removably connected to one of said tube end connectors and communicates through said connector with one of said trunk lines for transmittal of fluid from said manifold into said trunk line, said manifold further having an inlet for connection to a source of termiticide; and a pressurized source of fluid termiticide; whereby injecting a termiticide substance through said inlet, manifold, and delivery lines into said injection ends of said trunk lines attached to said panel provides redundant delivery of termiticide throughout said emitter circuit to the fill dirt underlying all edges and interruptions of, and openings through, said slab in an effective amount.

2. An improved termiticide delivery system for delivery of termiticide to the fill dirt underneath the foundation slab of a building at the edges and joints thereof, comprising:

an endless unbranched emitter circuit comprised of a length of flexible tubing having a plurality of apertures spaced along the wall thereof for emitting termiticide therethrough, said emitter circuit disposed atop and across the fill dirt under the foundation slab and vapor barrier of a building, at the perimeter edges of said slab and around the edges of all openings through and interruptions of said slab;

plurality of flexible open-ended trunk lines comprising unapertured tube means, each trunk line having an injection end and a delivery end, each said delivery end thereof connected to and opening into said emitter circuit at spaced-apart intervals, the spacing of said intervals being selected to minimize any fluid pressure differentials occurring within said emitter circuit, said trunk lines running under said slab to a common location on the outside of an exterior wall of said building;

a common receptacle box attached to said building wall and having a panel therein having a plurality of openings passing therethrough, and having the injection end of each of said trunk lines attached to said panel through one said opening therein, whereby injecting a termiticide substance into each of said injection ends attached to said panel provides redundant delivery of termiticide throughout said emitter circuit to ensure that the soil underlying all edges, openings through, and interruptions of said slab receives effective termiticide treatment.

3. An improved termiticide delivery system for delivery of termiticide to the fill dirt underneath the foundation slab of a building at the edges and joints thereof, comprising:

an endless unbranched emitter circuit comprised of a length of flexible tubing having a plurality of apertures spaced along the wall thereof for emitting termiticide therethrough, said emitter circuit disposed atop and across the fill dirt under the foundation slab and vapor barrier of a building, at the perimeter edges of said slab and around the edges of all openings through and interruptions of said slab;

a plurality of flexible open-ended trunk lines comprising unapertured tube means, each trunk line having an injection end and a delivery end, each said delivery end thereof connected to and opening into said emitter circuit at spaced-apart intervals, the spacing of said intervals being selected to minimize any fluid pressure differentials occurring within said emitter circuit, said trunk lines running under said slab to a common location on the outside of an exterior wall of said building;

a common receptacle box attached to said building wall and having a panel therein having a plurality of openings passing therethrough, and having the injection end of each of said trunk lines attached to said panel through one said opening therein, whereby injecting a termiticide substance into each of said injection ends attached to said panel provides redundant delivery of termiticide throughout said emitter circuit to ensure that the soil underlying all edges, openings through, and interruptions of said slab receives effective termiticide treatment;

applicator means comprising a manifold having a plurality of open-ended delivery lines comprised of flexible tubing, each line having a first end and a second end, each of said first ends thereof attached and opening into said manifold, and each of said second ends thereof having coupling means whereby it is removably connected to one of said tube end connectors and communicates through said connector with one of said trunk lines for transmittal of fluid from said manifold into said trunk line, said maifold also having an inlet for connection to a source of termiticide; and a pressurized source of fluid termiticide; whereby injecting a termiticide substance through said inlet, manifold, and delivery lines into said injection ends of said trunk lines attached to said panel provides redundant delivery of termiticide throughout said emitter circuit to the fill dirt underlying all edges and interruptions of, and openings through, said slab in an effective amount.

* * * * *